(12) United States Patent
Phillips

(10) Patent No.: US 8,070,638 B2
(45) Date of Patent: Dec. 6, 2011

(54) DUAL INPUT PLANETARY FINAL DRIVE

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 333 days.

(21) Appl. No.: 12/414,249

(22) Filed: Mar. 30, 2009

(65) Prior Publication Data

US 2010/0248885 A1    Sep. 30, 2010

(51) Int. Cl.
 *F16H 37/08* (2006.01)
(52) U.S. Cl. .................................................... 475/205
(58) Field of Classification Search ............ 475/220, 475/221, 205, 330, 331, 198
 See application file for complete search history.

(56) References Cited

U.S. PATENT DOCUMENTS

| | | | | |
|---|---|---|---|---|
| 5,836,848 A | * | 11/1998 | Janiszewski et al. | 475/204 |
| 6,076,623 A | * | 6/2000 | Teraoka et al. | 180/233 |
| 6,729,991 B1 | * | 5/2004 | Nishiji et al. | 475/221 |
| 7,246,536 B2 | * | 7/2007 | Baldwin | 74/340 |
| 7,309,301 B2 | * | 12/2007 | Janson et al. | 475/200 |

FOREIGN PATENT DOCUMENTS

| | | |
|---|---|---|
| DE | 69408961 T2 | 7/1998 |
| DE | 102004043939 A1 | 4/2006 |
| DE | 102008015751 A1 | 10/2008 |
| EP | 0238521 B1 | 9/1987 |
| EP | 1431613 A2 | 6/2004 |

* cited by examiner

*Primary Examiner* — David D Le
*Assistant Examiner* — David J Hlavka

(57) ABSTRACT

The present invention provides a final drive assembly having a differential driven by a planetary gear set having two inputs. The ring gear of the planetary gear set is stationary. One of the inputs is coupled to and drives the planet gear carrier which, in turn, is coupled to and drives the cage of the differential. The other input is coupled to and drives the sun gear of the planetary gear set. Incorporated into a suitable powertrain, for example, one having a dual clutch transmission (DCT) with two outputs, one associated with higher ratio (lower speed) gears and another associated with lower ratio (higher speed) gears, the sun gear carries power in the lower speed gears and provides torque multiplication. In the higher speed gears, power is carried by the planet gear carrier directly to the differential cage, bypassing the speed reduction, torque multiplication and gear mesh losses of the planetary gear set.

15 Claims, 4 Drawing Sheets

DUAL INPUT PLANETARY FINAL DRIVE

FIELD

The present disclosure relates to motor vehicle final drive assemblies and more particularly to a final drive assembly for a motor vehicle having a planetary gear assembly with two inputs.

BACKGROUND

The statements in this section merely provide background information related to the present disclosure and may or may not constitute prior art.

The final drive assembly of the majority of passenger cars, sport utility vehicles and trucks includes a differential having two opposed pairs of bevel gears disposed in a cage which is secured to and rotates with a gear driven by the output of the transmission or transfer case. One pair of the gears are idler gears which each engage both of the other pair of gears which are coupled to and drive the axles.

While the primary purpose of the differential is to allow side-to-side variation in the rotational speed of the axles during cornering, a hypoid gear set which drives the differential typically provides an approximately three-to-one to four-to-one speed reduction and corresponding torque increase. So located, components of the transmission and propshaft may be somewhat less robust as they transmit lower torque levels than they would if such final drive speed reduction and torque multiplication did not occur proximate the axles.

Clearly, therefore, greater speed reduction and torque multiplication in the final drive assembly can achieve weight savings by permitting smaller and thus lighter weight components in a vehicle powertrain. However, as in all things engineering, there are limits to this approach. To achieve significant speed reductions and torque multiplications beyond that achieved by a typical hypoid gear set, an additional gear set will be required. This additional gear set introduces an energy loss and reduction in efficiency during all operating conditions. Furthermore, while the torque multiplication is desirable at lower speeds, it becomes less so at higher speeds. In fact, during many higher speed operating conditions, it would be desirable to directly drive the differential assembly and eliminate the speed reduction and energy loss of the final drive gear set.

In heavy duty trucks having eight, ten and twelve speed transmissions, these choices of gears are often augmented by two speed rear axles (differentials) which effectively double the choice of gears. Unfortunately, the cost and complexity of such devices renders them unsuitable for use or adaptation in lighter weight and duty vehicles such as passenger cars, sport utility vehicles and consumer trucks. For example, a two speed truck axle will have one and more typically two clutches which selectively couple an input to one of two gear assemblies or components that provide the two drive ratios to the rear differential.

SUMMARY

The present invention provides a final drive assembly having a differential driven by a planetary gear set having two inputs. The ring gear of the planetary gear set is stationary and may be grounded to, for example, the housing of the differential. One of the inputs is coupled to and drives the planet gear carrier which, in turn, is coupled to and drives the differential cage. The other input is coupled to and drives the sun gear. Incorporated into a suitable powertrain, for example, one having a dual clutch transmission (DCT) with two outputs, one associated with higher ratio (lower speed) gears and another associated with lower ratio (higher speed) gears, the sun gear carries power in the lower speed gears and provides torque multiplication equal to 1+R/S, where R/S is the ring to sun gear tooth ratio. In the higher speed gears, power is carried by the planet gear carrier directly to the differential cage, bypassing the speed reduction, torque multiplication and gear mesh losses of the planetary gear set. Various physical arrangements or layouts of the final drive assembly according to the present invention are also disclosed.

It is thus the object of the present invention to provide a final drive assembly for a motor vehicle powertrain having a differential with two inputs.

It is a further object of the present invention to provide a final drive assembly for a motor vehicle powertrain having a conventional caged differential and two inputs.

It is a still further object of the present invention to provide a final drive assembly for passenger cars, sport utility vehicles and trucks having a differential with a first and a second input.

It is a still further object of the present invention to provide a final drive assembly for motor vehicles having a differential and a planetary gear set with a first and a second input.

It is a still further object of the present invention to provide a final drive assembly for motor vehicles having a differential driven by the planet gear carrier of a planetary gear set.

It is a still further object of the present invention to provide a final drive assembly for motor vehicles having a differential driven by the planet gear carrier of a planetary gear set having two inputs.

It is a still further object of the present invention to provide a final drive assembly for passenger cars, sport utility vehicles and trucks having a differential driven by the planet gear carrier of a planetary gear set having two inputs.

It is a still further object of the present invention to provide a final drive assembly for motor vehicles having a differential driven by the planet gear carrier of a planetary gear set having two inputs driven by the outputs of a dual clutch transmission.

It is a still further object of the present invention to provide a final drive assembly for passenger cars, sport utility vehicles and trucks having a differential driven by the planet gear carrier of a planetary gear set having two inputs coupled to the outputs of a dual clutch transmission.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 4A:
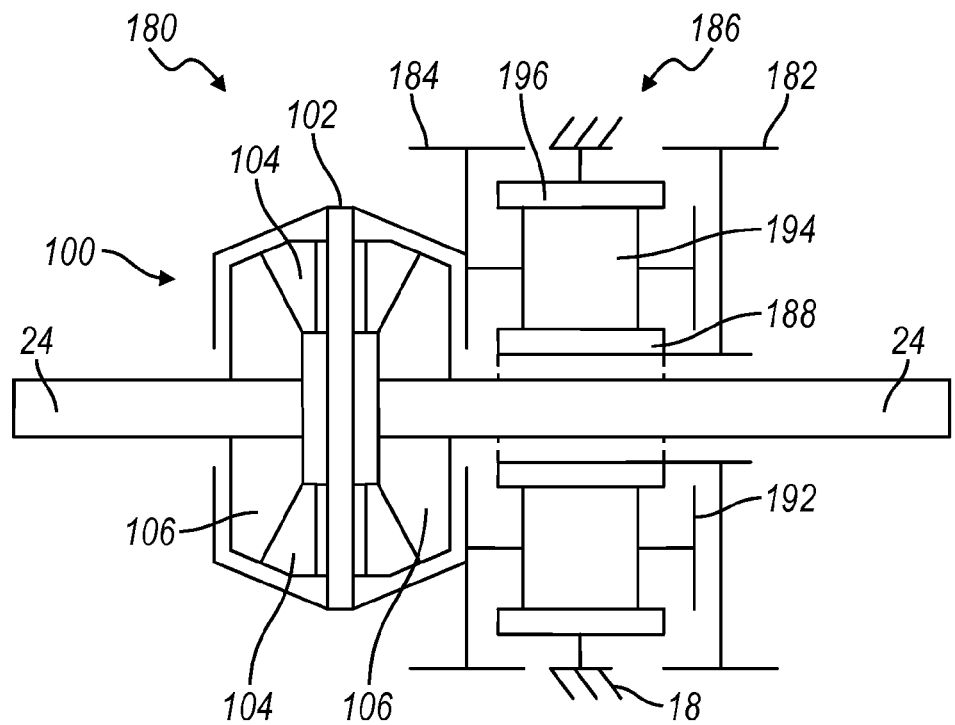
Figure 4B:
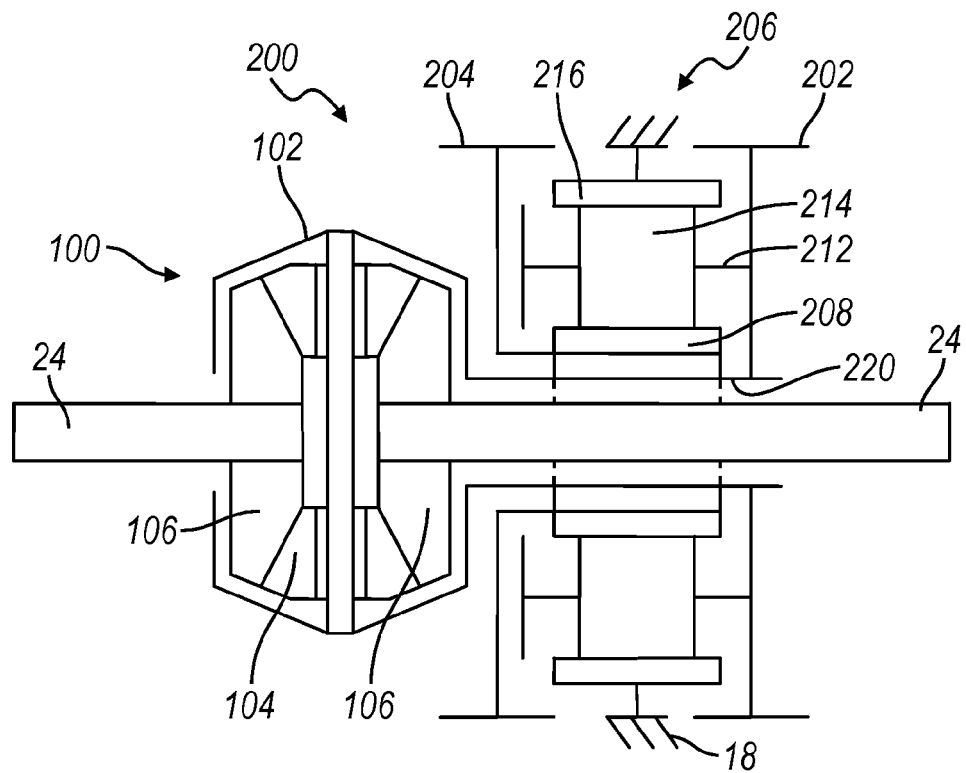
Figure 5A:
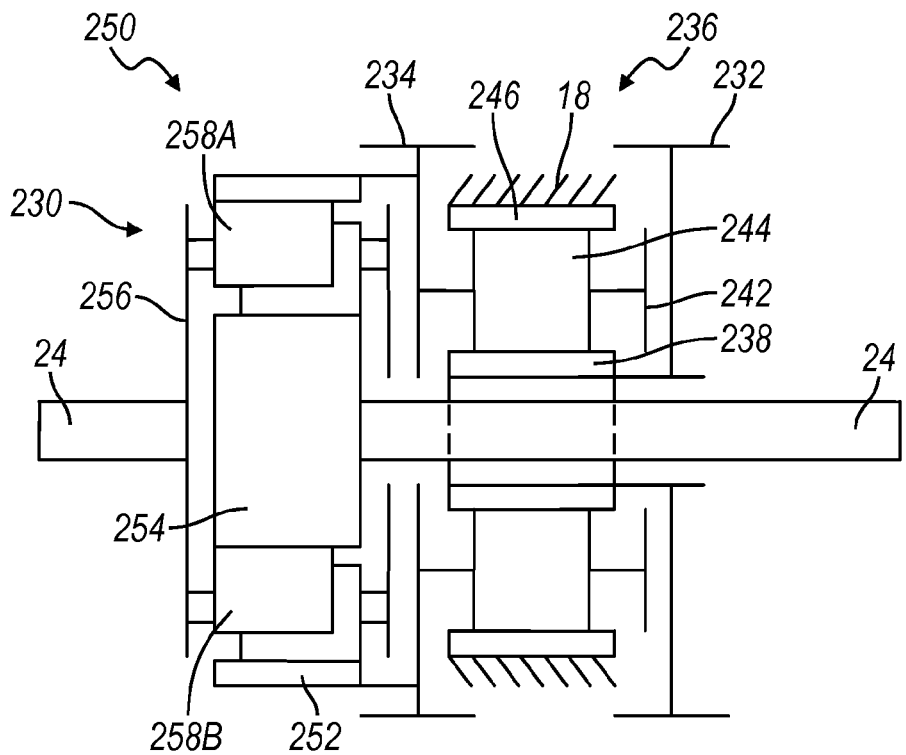
Figure 5B:
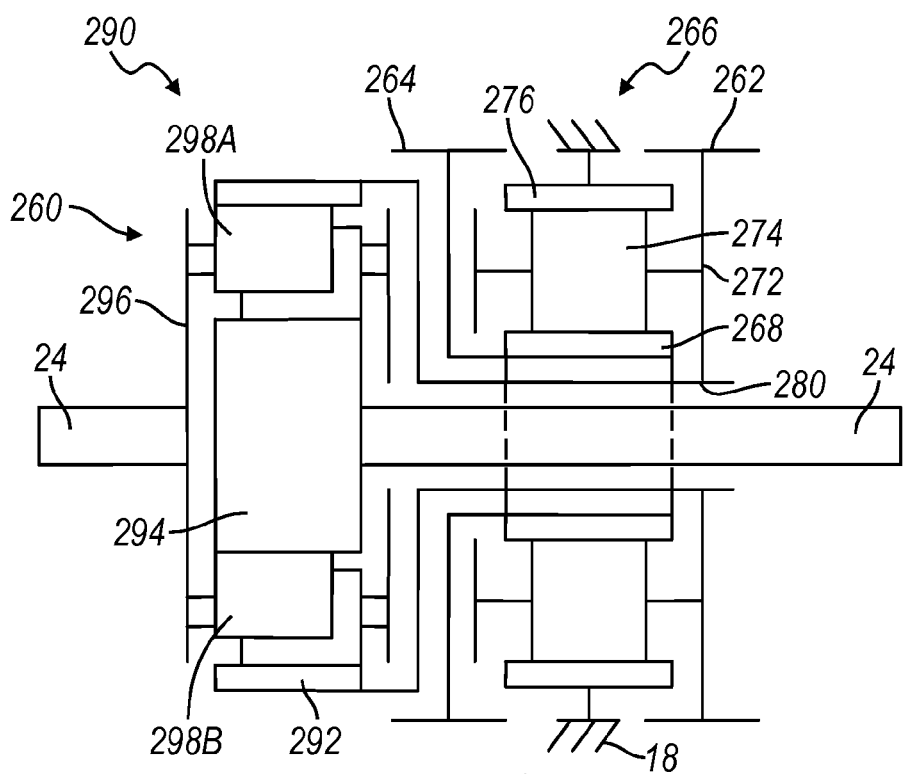

FIGS. 4A and 4B are schematic illustrations of two layouts of the final drive assembly according to the present invention incorporating a cage differential and inputs flanking the dual input planetary gear set; and FIGS. 5A and 5B are schematic illustrations of two layouts of the final drive assembly according to the present invention incorporating a planetary gear differential and inputs flanking the dual input planetary gear set.

DETAILED DESCRIPTION

The following description is merely exemplary in nature and is not intended to limit the present disclosure, application, or uses.

Figure 1:
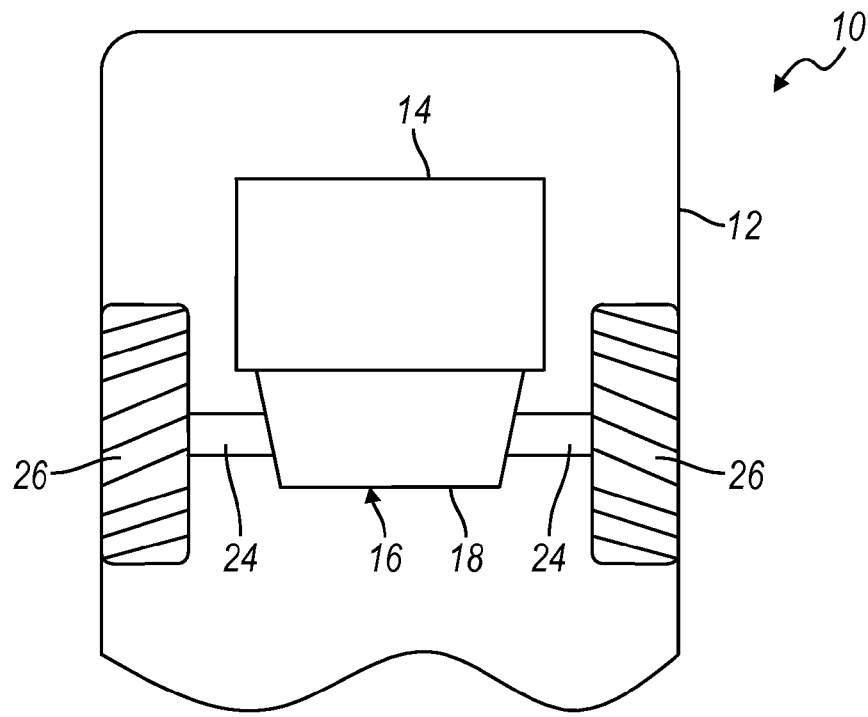
FIG. 1 is a schematic diagram of a motor vehicle such as a passenger car, sport utility vehicle or truck illustrating a transversely mounted engine, dual clutch transmission and final drive assembly according to the present invention.
Figure 2:
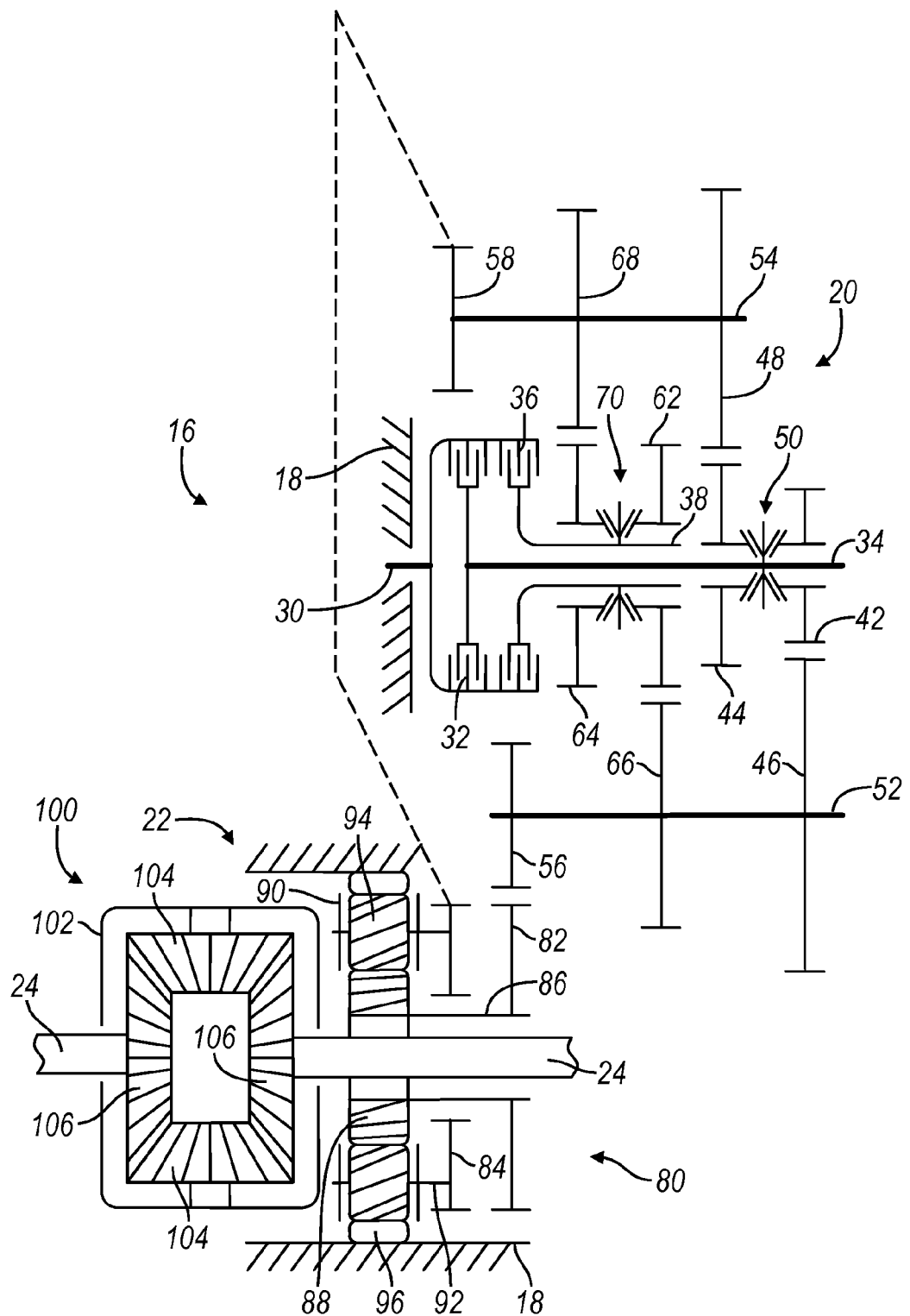
FIG. 2 is a diagrammatic view of a dual clutch transmission and final drive assembly incorporating a dual input planetary gear set and cage differential according to the present invention.

With reference to FIGS. 1 and 2, a forward portion of a motor vehicle is schematically illustrated and generally designated by the reference number 10. The motor vehicle 10 includes a body 12 which receives and supports a prime mover 14 such as a gasoline, E-85 or Diesel internal combustion engine or hybrid power plant. The output of the prime mover 14 is coupled to the input of a transaxle 16 having a housing 18 which contains and protects a transmission 20 and a final drive assembly 22 which will both be further described below. A pair of output shafts or drive axles 24 extend transversely and co-axially from the transaxle 16 and are coupled to and drive front tire and wheel assemblies 26 through constant velocity universal joints (not illustrated). The motor vehicle 10 also includes steering, braking, electrical, fuel and other systems (not illustrated) which form no significant portion of this invention.

Referring now to FIG. 2, the transmission 20 is preferably a dual clutch transmission (DCT) or similar type of transmission having two independent outputs, one of which is associated with the higher ratio (lower speed) gears and the other of which is associated with the lower ratio (higher speed) gears. The transmission 20 includes an input shaft 30 which may be driven directly by the prime mover 14 or may be coupled to the output of the prime mover 14 by a chain or a gear train (both not illustrated). The input shaft 30 is coupled to and drives a pair of independently and mutually exclusively operating input clutches: a first input clutch 32 associated with a first drive shaft 34 and a second, preferably co-axial, input clutch 36 associated with a second drive tube or quill 38. When the first input clutch 32 is engaged, drive torque is provided to the first drive shaft 34; when the second input clutch 36 is engaged, drive torque is provided to the second drive tube 38. The first and second input clutches 32 and 36 are preferably multiple plate friction pack assemblies.

Coaxially disposed about the end of the first drive shaft 34 opposite the first input clutch 32 are a pair of spaced apart drive gears: a first drive gear 42 and a second drive gear 44. The first drive gear 42 is in constant mesh with a first driven gear 46 and the second drive gear 44 is in constant mesh with a second driven gear 48. The first driven gear 46 is secured to and drives a first countershaft or layshaft 52 and the second driven gear 48 is secured to and drives a second countershaft or layshaft 54. Disposed between the first drive gear 42 and the second drive gear 44 is a first double synchronizer clutch and actuator assembly 50. When activated to a first position, for example, to the right in FIG. 2, the double synchronizer clutch and actuator assembly 50 synchronizes the speed of the first drive gear 42 and the first drive shaft 34 and then positively couples them together through the agency of a face or dog clutch (not illustrated). When activated to a second position, for example, to the left in FIG. 2, the double synchronizer clutch and actuator assembly 50 synchronizes the speed of the second drive gear 44 and the first drive shaft 34 and then positively couples them together through the agency of a second face or dog clutch (also not illustrated). In a third, center or neutral position, illustrated in FIG. 2, the first and second drive gears 42 and 44 freewheel in the first drive shaft 34.

A similar gear and synchronizer arrangement is associated with the second drive tube or quill 38. Coaxially disposed about the end of the second drive tube 38 opposite the second input clutch 36 are a second pair of spaced apart drive gears: a third drive gear 62 and a fourth drive gear 64. The third drive gear 62 is in constant mesh with a third driven gear 66 and the fourth drive gear 64 is in constant mesh with a fourth driven gear 68. The third driven gear 66 is secured to and also drives the first countershaft or layshaft 52 and the fourth driven gear 68 is also secured to and drives the second countershaft or layshaft 54. Disposed between the third drive gear 62 and the fourth drive gear 64 is a second double synchronizer clutch and actuator assembly 70. When activated to a first position, for example, to the right in FIG. 2, the double synchronizer clutch and actuator assembly 70 synchronizes the speed of the third drive gear 62 and the second drive tube or quill 38 and then positively couples them together through the agency of a face or dog clutch (not illustrated). When activated to a second position, for example, to the left in FIG. 2, the double synchronizer clutch and actuator assembly 70 synchronizes the speed of the fourth drive gear 64 and the second drive tube 38 and then positively couples them together through the agency of a second face or dog clutch (also not illustrated). In a third, center or neutral position, illustrated in FIG. 2, the third and fourth drive gears 62 and 64 freewheel in the second drive tube 38. The first countershaft or layshaft 52 includes and drives a first output gear 56 and the second countershaft or layshaft 54 includes and drives a second output gear 58.

It will thus be appreciated that the dual clutch transmission illustrated in FIG. 2 is capable of providing four distinct forward speed or gear ratios. Preferably, the first drive and driven gears 42 and 46 provide first gear and the third drive and driven gears 62 and 66 provide second gear such that the lower speed (higher ratio) gears are both associated with one countershaft or layshaft, in this case, the first countershaft or layshaft 52. Correspondingly, the second drive and driven gears 44 and 48 provide third gear and the fourth drive and driven gears 64 and 68 provide fourth gear such that the higher speed (lower ratio) gears are both associated with the other countershaft or layshaft, in this case, the second countershaft or layshaft 54. Although not illustrated, a fifth, reverse gear may readily and conventionally be achieved by the incorporation of an additional gear train between one of the input members 34 and 38 and one of the countershafts or layshafts 52 and 54 having a third, idler gear to reverse direction as well as an additional single synchronizer clutch (all not illustrated). Other means of achieving reverse may also be utilized.

The final drive assembly 22 includes a planetary gear assembly 80 and a conventional cage or bevel gear differential 100. In constant mesh with the first output gear 56 on the first countershaft or layshaft 52 is a first final drive input gear 82. In constant mesh with the second output gear 58 on the second countershaft or layshaft 54 is a second final drive input gear 84. The first final drive input gear 82 is secured to and drives a first input drive tube or quill 86 which is coupled to and drives a sun gear 88 of the planetary gear assembly 80. The second final drive input gear 84 is coupled to a planet gear carrier 90 of the planetary gear assembly 80 and a cage 102 of the differential 100 by an axially extending tube or connector 92. The planet gear carrier 90 rotatably supports a plurality of planet gears 94 which each mesh with both the sun gear 88 and a stationary ring gear 96 which is preferably secured to the final drive housing 18.

The differential 100 also includes a first pair of opposed bevel idler gears 104 which are rotatably secured to the cage 102 and engage a second pair of opposed bevel drive gears 106 which are each coupled to and drive one of the output shafts or axles 24. The differential 100 functions in a conventional manner to provide drive torque to the axles 24 while also allowing relative rotational speed differences associated with cornering.

Operation of the final drive assembly 22 incorporating a dual input planetary gear assembly 80 and differential 100 according to the present invention will now be described, it being assumed that the reader is generally familiar with the operation of the dual clutch transmission 20. When either first gear has been selected by engagement of the first input gear 42 to the first input shaft 34 by operation of the first synchronizer and clutch assembly 50 and activation of the first input clutch 32 or second gear has been selected by engagement of the third input gear 62 to the second drive tube or quill 38 by operation of the second synchronizer and clutch assembly 70 and activation of the second input clutch 36, drive torque is supplied through the first countershaft or layshaft 52 and the gears 56 and 82 to the sun gear 88 of the planetary gear assembly 80. The planetary gear assembly 80 provides a speed reduction and torque multiplication equal to 1+R/S, where R/S is the tooth ratio of the ring gear 96 to the sun gear 88. The planet gear carrier 90 thus drives the differential cage 102 at a reduced speed and with increased torque relative to the output of the transmission 20.

When either third gear has been selected by engagement of the second input gear 44 to the first input shaft 34 by operation of the first synchronizer and clutch assembly 50 and activation of the first input clutch 32 or fourth gear has been selected by engagement of the fourth input gear 64 to the second drive tube 38 by operation of the second synchronizer and clutch assembly 70 and activation of the second input clutch 36, drive torque is supplied through the second countershaft or layshaft 52 and the gears 58 and 84 to the planet gear carrier 90 of the planetary gear assembly 80. The planet gear carrier 90 directly drives the cage 102 of the differential 100, without speed reduction or torque multiplication. More importantly, however, such direct drive eliminates the gear mesh losses associated with the planetary gear assembly 80 in the lower speed gears. This is especially beneficial inasmuch as the transmission 20 and the final drive assembly 22 log far greater times and distances in the higher speed gears than in the lower speed gears.

Figure 3:
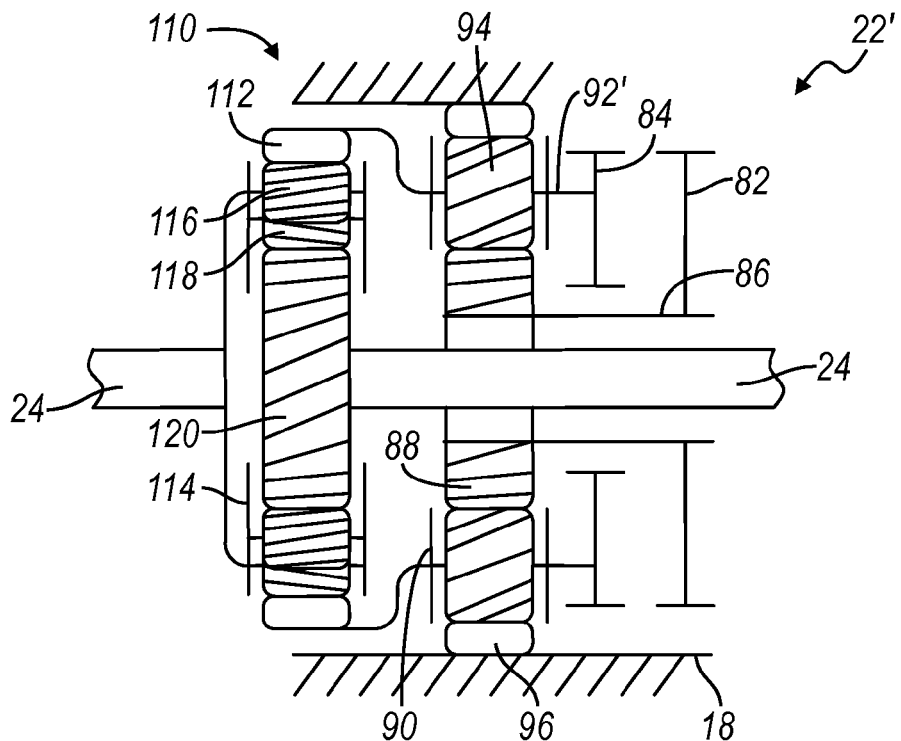
FIG. 3 is another embodiment of the present invention incorporating a planetary gear differential according to the present invention.

Referring now to FIG. 3, another embodiment of the final drive assembly 22' is illustrated. The final drive assembly 22' includes the final drive input gears 82 and 84, the first input drive tube or quill 86, the sun gear 88, the planetary gear carrier 90, a tube or connector 92', the planet gears 94 and the ring gear 96. Rather than a conventional cage differential such as the differential 100 illustrated in FIG. 2, the embodiment 22' includes a compound planetary gear differential 110 in which a ring gear 112 is coupled to and driven by the tube or connector 92'. A planet gear carrier 114 rotatably supports a plurality of pinion or planet gear trains each of which includes an outer pinion or planet gear 116 which meshes with the ring gear 112 and an inner pinion or planet gear 118. The inner pinion or planet gear 118 meshes with the outer pinion or planet gear 116, as stated, and a sun gear 120. The planet gear carrier 114 is coupled to and drives one of the axles 24. The sun gear 120 is coupled to and drives the other axle 24.

A visual comparison of the cage differential 100 of FIG. 2 and the planetary gear differential 110 of FIG. 3 reveals the benefit of the latter configuration: the shorter axial length (width) of the final drive assembly 22'. Since this type of final drive assembly is generally mounted transversely in the vehicle, and component width is often an issue in transversely mounted powertrains, the planetary gear differential 110 of the final drive assembly 22' provides improved design and packaging flexibility.

Referring now to FIG. 4A, a final drive assembly 180 having inputs flanking the input or torque multiplying planetary gear assembly includes a first final drive input gear or chain sprocket 182 and a second final drive input gear or chain sprocket 184 which both flank an input or torque multiplying planetary gear assembly 186 having a sun gear 188, a planet gear carrier 192 which rotatably carries and supports a plurality of planet gears 194, and a ring gear 196. The sun gear 188 is coupled to the first gear or chain sprocket 182 and the planet gear carrier 192 is coupled to the second gear or chain sprocket 184. The ring gear 196 is grounded to, for example, a housing 18. The planet gear carrier 192 is also coupled to a cage 102 of a differential 100 which includes a pair of opposed bevel idler gears 104 and a pair of opposed bevel output gears 106 which are coupled to a respective pair of output shafts or axles 24.

Referring now to FIG. 4B, another final drive assembly 200 having inputs flanking the input or torque multiplying planetary gear assembly includes a first final drive input gear or chain sprocket 202 and a second final drive input gear or chain sprocket 204 which both flank an input or torque multiplying planetary gear assembly 206 having a sun gear 208, a planet gear carrier 212 which rotatably carries and supports a plurality of planet gears 214, and a ring gear 216. The first gear or chain sprocket 202 is coupled to the planet gear carrier 212 and a quill, drive tube or drive member 220 which, in turn, is coupled to a cage 102 of a differential assembly 100. The second gear or chain sprocket 204 is coupled to the sun gear 208. The ring gear 216 is grounded to, for example, a housing 18. The differential 100 includes a pair of opposed bevel idler gears 104 and a pair of opposed bevel output gears 106 which are coupled to a respective pair of output shafts or axles 24.

Referring now to FIG. 5A, a third final drive assembly 230 having inputs flanking the input or torque multiplying planetary gear assembly includes a first final drive input gear or chain sprocket 232 and a second final drive input gear or chain sprocket 234 which both flank an input or torque multiplying planetary gear assembly 236 having a sun gear 238, a planet gear carrier 242 which rotatably carries and supports a plurality of planet gears 244, and a ring gear 246. The first gear or chain sprocket 232 is coupled to the sun gear 238. The ring gear 246 is grounded to, for example, a housing 18. The second gear or chain sprocket 234 is coupled to the planet gear carrier 242 and a ring gear 252 of a compound planetary gear differential assembly 250. The compound planetary gear differential assembly 250 also includes a sun gear 254 which is coupled to and drives one of the output shafts or axles 24 and a planet gear carrier 256 which rotatably supports a plurality of pairs of planet gears 258A and 258B. The planet gear carrier 256 is coupled to and drives another one of the output shafts or axles 24.

Referring now to FIG. 5B, a fourth final drive assembly 260 having inputs flanking the input or torque multiplying planetary gear assembly includes a first final drive input gear or chain sprocket 262 and a second final drive input gear or chain sprocket 264 which both flank an input or torque multiplying planetary gear assembly 266 having a sun gear 268, a planet gear carrier 272 which rotatably carries and supports a plurality of planet gears 274, and a ring gear 276. The ring gear 196 is grounded to, for example, a housing 18. The first gear or chain sprocket 262 is coupled to the planet gear carrier 272 and a quill, drive tube or drive member 280 which, in turn, is coupled to a ring gear 292 of a compound planetary gear differential assembly 290. The compound planetary gear differential assembly 290 also includes a sun gear 294 which is coupled to and drives one of the output shafts or axles 24 and a planet gear carrier 296 which rotatably supports a plurality of pairs of planet gear 298A and 298B. The planet gear carrier 296 is coupled to and drives another one of the output shafts or axles 24.

It should be appreciated that the final drive assemblies 22, 22', 180, 200, 230 and 260 of the present invention not only provide both reduced gear mesh losses in the higher and more frequently utilized gears relative to the lower speed gears and allow size and weight reduction of the lower speed transmission gears but they also achieve these benefits without any additional clutches, synchronizers or range or gear selection components.

The foregoing description of the invention is merely exemplary in nature and variations that do not depart from the gist of the invention are intended to be within the scope of the invention. Such variations are not to be regarded as a departure from the spirit and scope of the invention and the following claims.

What is claimed is:

1. A final drive assembly for a motor vehicle comprising, in combination,
    a first input for receiving lower speed range power from a transmission,
    a second input for receiving higher speed range power from a transmission,
    a planetary gear assembly having a grounded ring gear, a sun gear coupled to said first input, a planet gear carrier coupled to said second input and having a plurality of planet gears,
    a differential having an outer member coupled to said planet carrier and a pair of differentially rotatable outputs adapted to drive a respective pair of axles,
    a transmission having a first output carrying lower speed ranges coupled to said first input of said final drive assembly and a second output carrying higher speed ranges coupled to said second input of said final drive assembly, and
    a first gear set operably disposed between said first output of said transmission and said first input of said final drive assembly and a second gear set operably disposed between said second output of said transmission and said second input of said final drive assembly.

2. The final drive assembly of claim 1 wherein said differential is a cage differential, said outer member is a cage and further including a pair of opposed idler gears and a pair of drive gears meshing with both idler gears and coupled to a respective one of a pair of axles.

3. The final drive assembly of claim 1 wherein said differential is a compound planetary gear assembly, said outer member is a ring gear and further including a planet gear carrier coupled to one of a pair of axles and a sun gear coupled to another of a pair of axles.

4. The final drive assembly of claim 1 wherein said transmission is a dual clutch transmission.

5. The final drive assembly of claim 1 further including a drive tube between said first input and said sun gear and wherein an axle extends through said drive tube.

6. A final drive assembly for a motor vehicle comprising, in combination,
    a first input member adapted to receive lower speed drive torque from a transmission,
    a second input member adapted to receive higher speed drive torque from said transmission,
    a planetary gear set having a stationary ring gear, a sun gear coupled to said first input member, and a planet gear carrier coupled to said second input member,
    a differential having an input coupled to said planet gear carrier and means for providing a pair of differential outputs coupled to a respective pair of axles,
    a transmission having a first output carrying lower speed ranges coupled to said first input member and a second output carrying higher speed ranges coupled to said second input member, and
    a first gear set operably disposed between said first output of said transmission and said first input member and a second gear set operably disposed between said second output of said transmission and said second input member.

7. The final drive assembly of claim 6 wherein said differential is a cage differential, said input is a cage and said means includes a pair of opposed idler gears and a pair of drive gears meshing with both idler gears and coupled to a respective one of a pair of axles.

8. The final drive assembly of claim 6 wherein said differential is a compound planetary gear assembly, said input is a ring gear and said means is a planet gear carrier coupled to one of a pair of axles and a sun gear coupled to another of a pair of axles.

9. The final drive assembly of claim 6 wherein said transmission is a dual clutch transmission.

10. The final drive assembly of claim 6 wherein said first input member is a drive tube coupled to said sun gear and wherein an axle extends through said drive tube.

11. A drive assembly for a motor vehicle comprising, in combination,
    a first input for receiving drive torque associated with a first set of transmission gear ratios,
    a second input for receiving drive torque associated with a second set of transmission gear ratios,
    a planetary gear set having a stationary ring gear, a sun gear coupled to said first input and a planet gear carrier coupled to said second input, and a differential having an outer member coupled to said planet carrier and means for providing a pair of differentiated outputs,
    a transmission having a first output associated with the first set of transmission gear ratios coupled to said first input and a second output associated with the second set of transmission gear ratios coupled to said second input, and
    a first gear set operably disposed between said first output of said transmission and said first input member and a second gear set operably disposed between said second output of said transmission and said second input member.

12. The drive assembly of claim 11 further including a pair of axles driven by said pair of differentiated outputs.

13. The drive assembly of claim 11 wherein said differential is a cage differential, said outer member is a cage and said means includes a pair of opposed idler gears and a pair of drive gears meshing with both idler gears.

14. The drive assembly of claim 11 wherein said differential is a compound planetary gear assembly, said outer member is a ring gear and said means is a planet gear carrier providing one of said outputs and a sun gear providing another of said pair of outputs.

15. The drive assembly of claim 11 wherein said transmission is a dual clutch transmission.

* * * * *